United States Patent
Mielenz

(10) Patent No.: US 9,561,796 B2
(45) Date of Patent: Feb. 7, 2017

(54) SPEED ASSISTANT FOR A MOTOR VEHICLE

(71) Applicant: Robert Bosch GmbH, Stuttgart (DE)

(72) Inventor: Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 77 days.

(21) Appl. No.: 14/469,836

(22) Filed: Aug. 27, 2014

(65) Prior Publication Data
US 2015/0066329 A1 Mar. 5, 2015

(30) Foreign Application Priority Data

Aug. 27, 2013 (DE) .................. 10 2013 216 994

(51) Int. Cl.
| | | |
|---|---|---|
| *G05D 1/00* | (2006.01) | |
| *G06F 7/00* | (2006.01) | |
| *B60W 30/14* | (2006.01) | |
| *G08G 1/00* | (2006.01) | |
| *B60W 50/14* | (2012.01) | |

(Continued)

(52) U.S. Cl.
CPC ............ *B60W 30/143* (2013.01); *B60W 30/16* (2013.01); *B60W 50/14* (2013.01); *G01S 13/931* (2013.01); *G08G 1/00* (2013.01); *G08G 1/165* (2013.01); *G08G 1/166* (2013.01); *G08G 1/167* (2013.01); *B60W 30/18145* (2013.01); *B60W 30/18154* (2013.01); *B60W 2420/42* (2013.01); *B60W 2420/52* (2013.01); *B60W 2550/10* (2013.01); *G01S 2013/9321* (2013.01); *G01S 2013/9353* (2013.01); *G01S 2013/9375* (2013.01); *G01S 2013/9392* (2013.01)

(58) Field of Classification Search
CPC ................. B60W 2420/42; B60W 2420/52; B60W 2550/10; B60W 30/143; B60W 30/16; B60W 30/18145; B60W 30/18154; B60W 50/14; G01S 13/931; G01S 2013/9321; G01S 2013/9353; G01S 2013/9375; G01S 2013/9392
USPC ............................................ 701/93, 96, 301
See application file for complete search history.

(56) References Cited

U.S. PATENT DOCUMENTS

| | | | | |
|---|---|---|---|---|
| 5,670,935 A | * | 9/1997 | Schofield ............... | B60N 2/002 340/435 |
| 6,230,093 B1 | * | 5/2001 | Michi ................... | G01S 13/931 180/167 |

(Continued)

FOREIGN PATENT DOCUMENTS

DE    10 2004 005 229    8/2005

*Primary Examiner* — Khoi Tran
*Assistant Examiner* — Jorge Peche
(74) *Attorney, Agent, or Firm* — Norton Rose Fulbright US LLP; Gerard Messina

(57) ABSTRACT

A method for controlling a motor vehicle includes steps of controlling a longitudinal speed of the motor vehicle to a predetermined value and scanning an upcoming driving route with the aid of a sensor on board the motor vehicle. One end of a section of the driving route which is visible with the aid of the sensor is determined. Assuming that there is an obstacle on the driving route beyond the visible section, it is determined that a deceleration which would be required to maintain a predetermined minimum distance from the assumed obstacle exceeds a predetermined threshold value, and a signal is output to a driver of the motor vehicle.

12 Claims, 4 Drawing Sheets

(51) Int. Cl.
*B60W 30/16* (2012.01)
*G01S 13/93* (2006.01)
*G08G 1/16* (2006.01)
*B60W 30/18* (2012.01)

(56) References Cited

U.S. PATENT DOCUMENTS

| | | | | |
|---|---|---|---|---|
| 6,411,898 | B2* | 6/2002 | Ishida | 340/436 |
| 7,038,577 | B2* | 5/2006 | Pawlicki | G06K 9/4604 |
| | | | | 340/435 |
| 7,688,188 | B2* | 3/2010 | Kume | G08G 1/162 |
| | | | | 340/435 |
| 7,720,580 | B2* | 5/2010 | Higgins-Luthman | B60R 1/00 |
| | | | | 250/208.1 |
| 8,036,803 | B2* | 10/2011 | Michi | B60K 31/0008 |
| | | | | 701/93 |
| 2001/0040505 | A1* | 11/2001 | Ishida | G01C 21/3697 |
| | | | | 340/435 |
| 2002/0138192 | A1* | 9/2002 | Lueder | B60K 31/0008 |
| | | | | 701/93 |
| 2002/0167589 | A1* | 11/2002 | Schofield | B60N 2/002 |
| | | | | 348/148 |
| 2003/0083818 | A1* | 5/2003 | Tojima | G01S 13/426 |
| | | | | 701/301 |
| 2003/0122930 | A1* | 7/2003 | Schofield | B60R 1/00 |
| | | | | 348/148 |
| 2005/0195383 | A1* | 9/2005 | Breed | B60N 2/002 |
| | | | | 356/4.01 |
| 2005/0243301 | A1* | 11/2005 | Takagi | B60W 40/02 |
| | | | | 356/4.07 |
| 2006/0055525 | A1* | 3/2006 | Kubota | G08G 1/0962 |
| | | | | 340/461 |
| 2006/0111842 | A1* | 5/2006 | Sugimoto | G08G 1/167 |
| | | | | 701/301 |
| 2007/0073484 | A1* | 3/2007 | Horibe | G01S 17/023 |
| | | | | 701/301 |
| 2008/0012938 | A1* | 1/2008 | Kubota | B60Q 9/008 |
| | | | | 348/118 |
| 2008/0239527 | A1* | 10/2008 | Okabe | B60Q 9/008 |
| | | | | 359/843 |
| 2009/0048768 | A1* | 2/2009 | Taguchi | G08G 1/166 |
| | | | | 701/117 |
| 2009/0125177 | A1* | 5/2009 | Tanaka | B60G 17/0165 |
| | | | | 701/31.4 |
| 2009/0153665 | A1* | 6/2009 | Linsenmaier | B60R 1/007 |
| | | | | 348/149 |
| 2010/0099353 | A1* | 4/2010 | Komori | G08G 1/096716 |
| | | | | 455/39 |
| 2012/0166058 | A1* | 6/2012 | Armbrust | B60Q 1/525 |
| | | | | 701/96 |
| 2013/0110316 | A1* | 5/2013 | Ogawa | G08G 1/096716 |
| | | | | 701/1 |
| 2013/0179379 | A1* | 7/2013 | Kurumisawa | G06N 5/02 |
| | | | | 706/46 |
| 2013/0218467 | A1* | 8/2013 | Ogawa | G08G 1/096827 |
| | | | | 701/533 |
| 2014/0169630 | A1* | 6/2014 | Fukata | G08G 1/167 |
| | | | | 382/103 |
| 2014/0229073 | A1* | 8/2014 | Mori | B62D 15/025 |
| | | | | 701/42 |
| 2014/0244114 | A1* | 8/2014 | Matsubara | G05D 1/024 |
| | | | | 701/41 |
| 2014/0244142 | A1* | 8/2014 | Matsubara | B60W 10/184 |
| | | | | 701/116 |
| 2014/0365104 | A1* | 12/2014 | Sasaki | B60W 30/18154 |
| | | | | 701/119 |
| 2015/0071490 | A1* | 3/2015 | Fukata | G06K 9/00791 |
| | | | | 382/103 |
| 2015/0338516 | A1* | 11/2015 | Kijima | G08G 1/166 |
| | | | | 701/1 |
| 2015/0360687 | A1* | 12/2015 | Meyer | B60T 7/22 |
| | | | | 701/70 |

* cited by examiner

SPEED ASSISTANT FOR A MOTOR VEHICLE

FIELD OF THE INVENTION

The present invention relates to a speed assistant for a motor vehicle. In particular, the present invention relates to a transfer of control from the speed assistant to a driver.

BACKGROUND INFORMATION

A speed assistant is configured to keep the speed of a motor vehicle at a predetermined value. As a result, the driver of the motor vehicle may be relieved of the task of the longitudinal control of the motor vehicle. In one variant, a distance from a preceding vehicle is also determined, and the speed of the motor vehicle is controlled in such a way that a predetermined minimum distance from the preceding vehicle is maintained. For this purpose, the predetermined speed may be undershot. The determination of the distance from the preceding vehicle takes place, for example, with the aid of a radar sensor or video sensor.

In certain situations, returning control of the longitudinal speed of the motor vehicle to the driver is necessary. For example, if the motor vehicle is following another vehicle and a third vehicle is cutting in between these two vehicles, the minimum distance to be maintained from the preceding vehicle may be abruptly undershot. In this case, a deceleration of the motor vehicle may be necessary which exceeds a predetermined threshold value, above which a braking operation may not be perceived as comfortable. In this case, the driver may be prompted to take over the speed control.

German Published Patent Appln. No. 10 2004 005 229 describes a distance control system for motor vehicles.

A corresponding warning or prompt may occur suddenly, so that the driver may be unable to respond appropriately in order to cope with the present traffic situation. The object of the present invention is therefore to provide a technique with which an improved transfer of a speed control of a motor vehicle to the driver may be carried out. The present invention achieves this object with the aid of the subject matter of the independent claims. Subclaims specify preferred specific embodiments.

SUMMARY

A method according to the present invention for controlling a motor vehicle includes steps of controlling a longitudinal speed of the motor vehicle to a predetermined value and scanning an upcoming driving route with the aid of a sensor on board the motor vehicle. One end of a section of the driving route which is visible with the aid of the sensor is determined. Assuming that there is an obstacle on the driving route beyond the visible section, it is determined that a deceleration which would be required to maintain a predetermined minimum distance from the assumed obstacle exceeds a predetermined threshold value, and a signal is output to a driver of the motor vehicle.

In this way, the driver may be informed early that the distance control will possibly be deactivated soon. The signal may be understood to mean a general warning of a situation in which a deceleration of the motor vehicle will be carried out.

In a first variant, the obstacle is assumed to be a preceding vehicle on the driving route having a predetermined speed. The assumption may be correct in many cases, and a usual minimum speed of the vehicle may be assumed. By assuming that an obstacle is moving away from the motor vehicle, only a lower or later deceleration is required to maintain the predetermined minimum distance. Thus, greater latitude may be allowed for the deceleration. The automatic maintenance of the minimum distance may thus be interrupted or deactivated less frequently.

In another variant, it is assumed that the obstacle is stationary on the driving route. This pessimistic assumption makes it possible to ensure to an improved degree that the motor vehicle may be brought to a stop before the obstacle in a timely manner. The longitudinal control of the motor vehicle may thus be designed to be defensive.

In one specific embodiment, it may be determined that an object is situated in the scanning range of the sensor which shadows a section of the driving route in the scanning range, and the end of the visible section corresponds to the beginning of the shadowed section. Thus, frequently encountered, possibly temporary reductions of the visible section may be taken into account to a particular degree.

The driving route may, for example, follow a curve, the object being situated on the inner side of the curve next to the driving route. Vegetation or buildings next to the driving route which temporarily reduce the visible section of the driving route may thus be taken into account in an improved manner.

The control of the longitudinal speed may be ended if a distance from the assumed obstacle falls below a predetermined distance. In this specific embodiment, a situation may in particular be taken into account in which the visible section is greatly reduced, for example, to the range of one or multiple vehicle lengths. Such a situation may, for example, exist when turning into a street or when turning into a driveway. Even if the traveling speed of the motor vehicle in this case may be less than when traveling on a rural road, by taking the severe visibility limitation into account in a timely manner, an anticipatory increase in the driver's attention may be achieved.

The signal is preferably output before an actual obstacle is detected on the driving route. In fact, the driver may be made aware of the approach of a situation in which the automatic speed control or the maintenance of distance control reaches its limits. As a result, an overall increase in safety in the area of the motor vehicle may be achieved.

In one variant, the control of the longitudinal speed is suspended as long as the deceleration which would be required for maintaining the minimum distance from the assumed obstacle beyond the visible section exceeds the predetermined threshold value. In other words, the control of the longitudinal speed may again be resumed as soon as it is possible to distance the motor vehicle safely and comfortably in case of doubt based on the present scanning results.

In one additional specific embodiment, in the case of shadowing of the required visibility range, the speed of the vehicle is adjusted to a value which would permit a predetermined maximum deceleration and thus a comfortable setting of the longitudinal guidance, should an obstacle be detected in the relevant traveling area. In other words, the longitudinal speed of the motor vehicle may be reduced until the deceleration which would be required for maintaining a predetermined minimum distance from the assumed obstacle maintains the predefined threshold value.

By adjusting the longitudinal speed, a later braking operation for avoiding a collision with the assumed obstacle may still be considered to be comfortable. The braking operation is carried out only if the obstacle actually exists or is actually detected. In this way, an automatically cautious control of the longitudinal speed may be carried out. The avoidance of collision with an obstacle may thus be carried out in a total of two stages.

In one specific embodiment, multiple alternative driving routes are determined and the determination of the signal is carried out for all driving routes. Through such a speculative check of different driving routes which present themselves, it is possible to respond dynamically to the driving behavior of the driver.

A computer program product according to the present invention includes program code means for carrying out the described method if the computer program product runs on a processing device or is stored on a computer-readable data carrier.

A device according to the present invention for controlling a motor vehicle includes a speed control for controlling a longitudinal speed of the motor vehicle to a predetermined value, a sensor on board the motor vehicle for scanning an upcoming driving route, and a signaling device for outputting a signal to a driver. Furthermore, a processing unit is provided which is configured to determine one end of a section of the driving route which is visible with the aid of the sensor, to determine that a deceleration which would be required to maintain a minimum distance from an assumed obstacle on the driving route beyond the visible section exceeds a predetermined threshold value, and to output a signal to the driver of the motor vehicle with the aid of the signaling device.

A known motor vehicle having a longitudinal speed control may thus be improved by the device in such a way that a safer driving behavior results.

DETAILED DESCRIPTION

Figure 1:
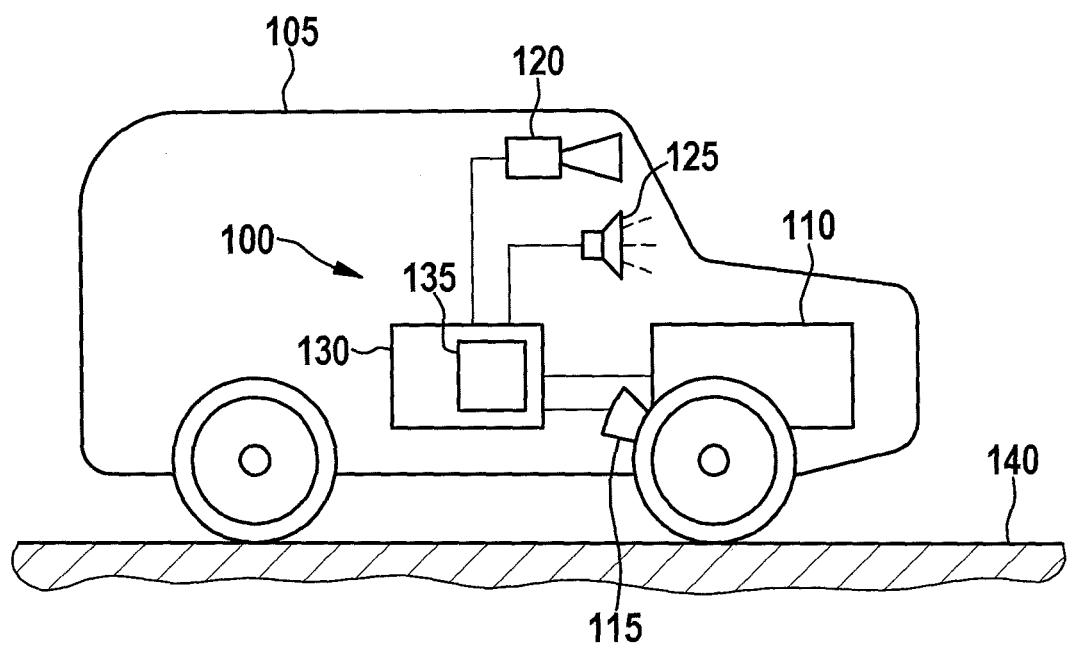
FIG. 1 shows a device for controlling a motor vehicle.

FIG. 1 shows a device 100 on board a motor vehicle 105. Motor vehicle 105 includes a drive engine 110 and a braking device 115. Device 100 includes a sensor 120, a signaling device 125, and a processing device 130. Sensor 120 may, for example, include a video sensor or a radar sensor. Signaling device 125 is configured for providing a signal to a driver of motor vehicle 105 and may signal audibly, visually, or haptically. Furthermore, a speed control 135 is provided which is included in the depicted specific embodiment of processing device 130. In another specific embodiment, speed control 135 may, however, also be implemented independently of processing device 130.

Speed control 135 acts on drive engine 110 and possibly on braking device 115 in order to implement a longitudinal control of motor vehicle 105. The speed of motor vehicle 105 is preferably controlled to a predetermined value. If motor vehicle 105 is on the verge of tailgating a preceding motor vehicle, which, for example, may be determined with the aid of sensor 120, the speed control may be suspended in favor of a distance control. A predetermined distance between motor vehicle 105 and the preceding motor vehicle is then preferably maintained.

Processing device 130 is configured to return the longitudinal control of motor vehicle 105 from speed control 135 to a driver if it is determined that a sharp deceleration is required in order to maintain a distance between motor vehicle 105 and an object situated on driving route 140. For this purpose, a signal is output to the driver with the aid of signaling device 125, and/or speed control 135 is deactivated. The deceleration may in particular be rated as sharp if it exceeds a predetermined deceleration value.

Processing device 130 determines in an anticipatory manner whether a situation results in which a safe longitudinal guidance of motor vehicle 105 may not be ensured in all circumstances.

Figure 2:
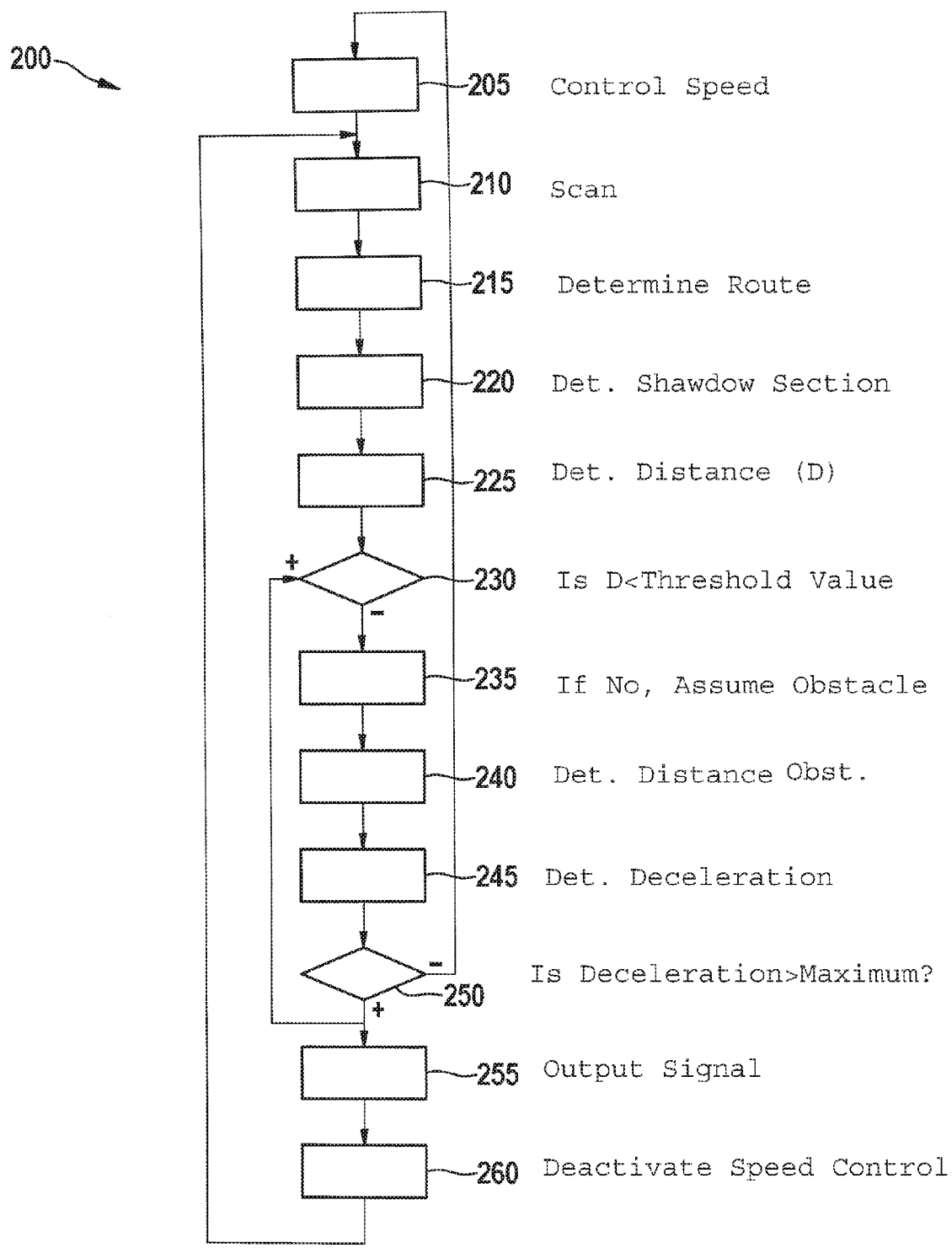
FIG. 2 shows a flow chart of a method for controlling the motor vehicle of FIG. 1.

FIG. 2 shows a flow chart of a method 200 for controlling motor vehicle 100 from FIG. 1. Method 200 is in particular configured for running on processing device 130. Processing device 130 may preferably include a programmable microcomputer.

In a first step 205, motor vehicle 105 is controlled to a predetermined speed with the aid of speed control 135. In parallel to this, the surroundings of motor vehicle 105 are scanned with the aid of sensor 120. In a step 215, one or multiple alternative upcoming driving routes 140 are determined. The subsequent steps may be carried out separately for multiple driving routes 140. Upcoming driving routes 140 may result from the signals of sensor 120 or, for example, may be determinable based on a planned driving route of a navigation system.

In a step 220, it is determined that one section of driving route 140 is shadowed for sensor 120. In a step 225, a distance up to the shadowed section is determined. In a step 230, it is checked whether the distance is smaller than a predetermined threshold value. The threshold value may, for example, be selected as a function of speed so that it is high if motor vehicle 105 travels fast, and lower if motor vehicle 105 travels slowly. If the distance is not smaller than the threshold value, in a step 235, an obstacle is assumed in the shadowed section, as explained below in greater detail with reference to FIG. 3. A distance up to the obstacle is determined in a step 240. On this basis, in a step 245, it is determined how great the deceleration would have to be in order to maintain a predetermined minimum distance between motor vehicle 105 and the obstacle.

In a step 250, it is checked whether the determined deceleration exceeds a predetermined maximum deceleration. If this is not the case, method 200 may branch back to the start and run through again. Otherwise, in an optional step 255, which may also be included in the subsequent step 260, a signal may be output with the aid of signaling device 125 to a driver of motor vehicle 105 for assuming the longitudinal control. This step may also be carried out if it was determined in step 230 that the distance of motor vehicle 105 up to the shadowed section falls below the predetermined threshold value.

Then, in a subsequent step 260, speed control 135 may be deactivated. Method 200 may be configured in such a way that speed control 135 is automatically reactivated if the criteria required for the deactivation are no longer present, or a specific action by the driver may be required in order to reactivate speed control 135 as part of method 200. This action may, for example, include the actuation of an input device.

Figure 3:
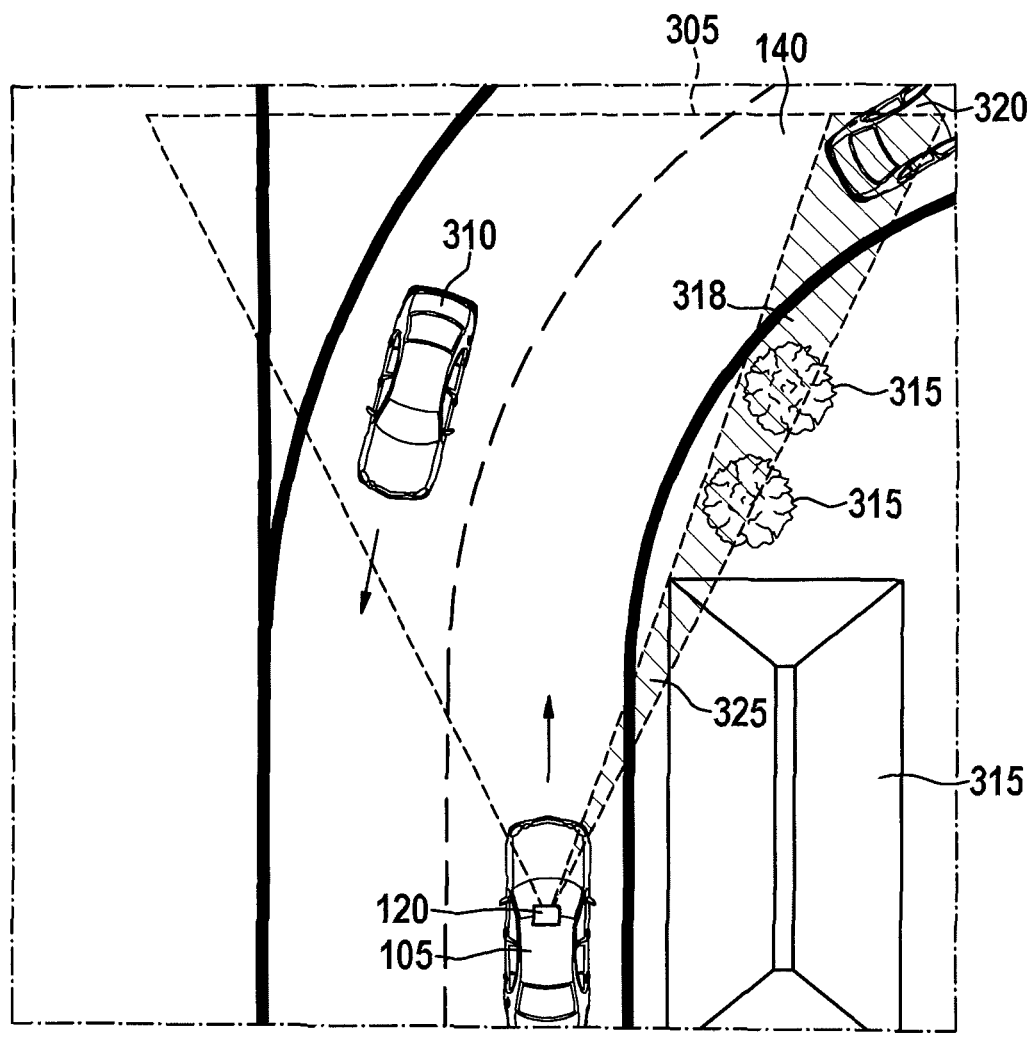
FIGS. 3 and 4 show situations of the motor vehicle of FIG. 1 during the control operation according to the method of FIG. 2.

FIG. 3 shows a first situation of motor vehicle 105 from FIG. 1 during the control operation of method 200.

Driving route 140 on which motor vehicle 105 is situated has two lanes in the depicted example and follows a curve in the area of motor vehicle 105. In the illustration, one visible section 305 of sensor 120 has an essentially triangular shape. An oncoming motor vehicle 310 is situated in section 305 and may be detected. It is preferably also detected that motor vehicle 310 is not situated in the same lane as motor vehicle 105 and is thus not relevant for a longitudinal control of motor vehicle 105.

One or multiple objects 315 are situated on the inner side of the curve of driving route 140 which shadow a part of driving route 140 and reduce visible section 305. An obstacle 320 situated behind objects 315 as seen from motor vehicle 105 could be relevant for the longitudinal control of motor vehicle 105.

Based on the signals of sensor 120, a shadowed section 318 situated behind object 315 is determined. Obstacle 320 is then in shadowed section 318 with the aid of method 200, a predetermined speed of obstacle 320 being assumed. If driving route 140 situated between assumed obstacle 320 and motor vehicle 105 is still long enough so that motor vehicle 105 may be braked sufficiently slowly if required without breaching a minimum distance to obstacle 320, speed control 135 may remain activated. Otherwise, the driver of motor vehicle 105 is signaled that there could be a situation ahead in which the automatic longitudinal control of motor vehicle 105 may no longer be carried out safely.

Figure 4:
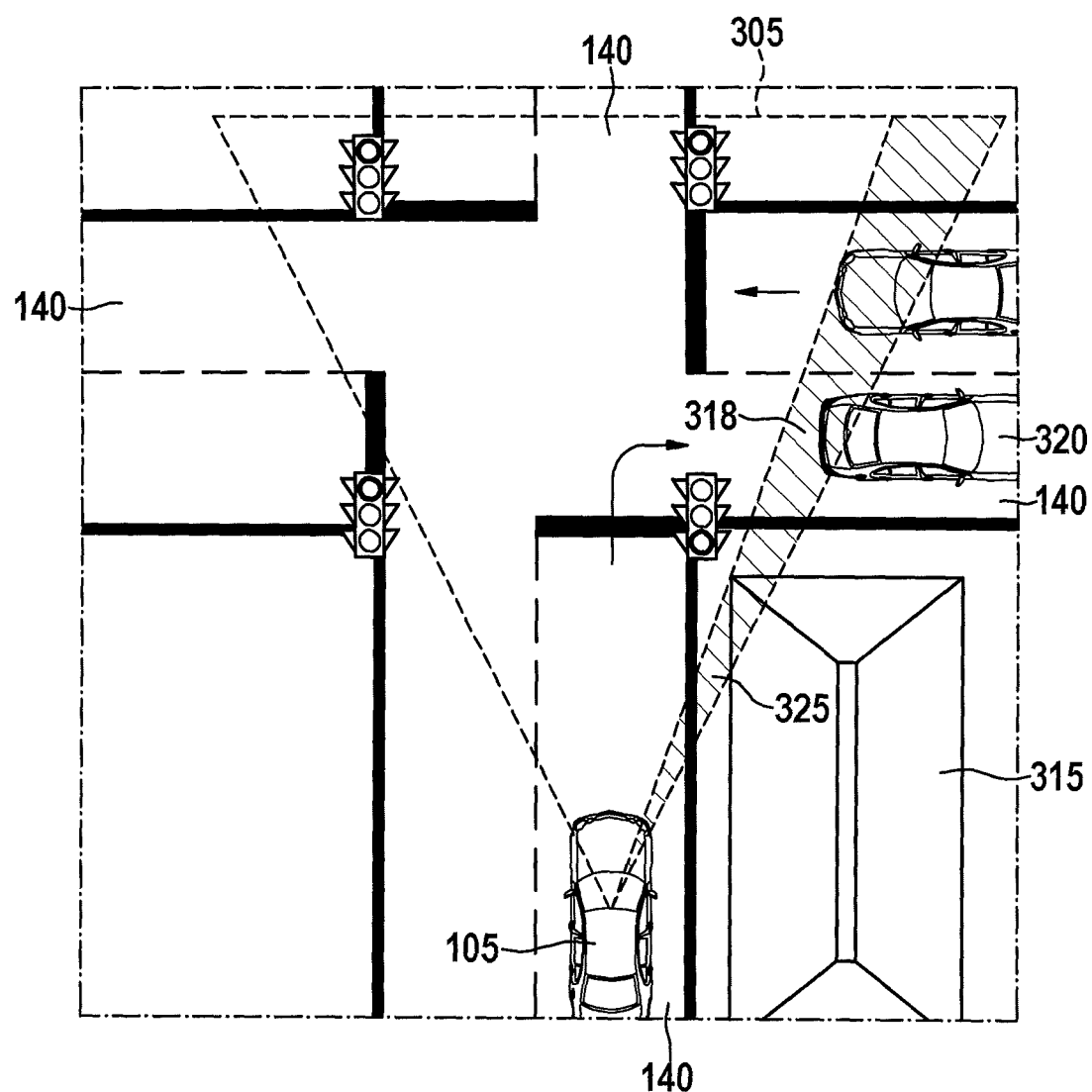

FIG. 4 shows an additional situation of motor vehicle 105 of FIG. 1 during the control operation with the aid of method 200 of FIG. 2. In the depicted example, different driving routes 140 may be chosen by the driver of motor vehicle 105. Method 200 of FIG. 2 must therefore possibly be carried out for each of possible driving routes 140. If there is a reason to deactivate speed control 135 on one of driving routes 140, a corresponding signal may be output to the driver of motor vehicle 105 even if the other driving routes 140 are highly visible.

If it is assumed that motor vehicle 105 in the depiction of FIG. 4 turns right at the intersection, an area of driving route 140 behind object 315 is not visible up to just before the actual turning. If a stationary obstacle 320 is situated in section 318 which is shadowed by object 315, for example, another motor vehicle, this may potentially be noticed too late to allow a sufficiently safe braking of motor vehicle 105. Obstacle 320 may be assumed to be motionless in shadowed section 318 with the aid of method 200, and speed control 135 may be maintained as long as safe stopping before assumed obstacle 320 is safely possible based on the speed and distance of motor vehicle 105 from obstacle 320.

What is claimed is:

1. A method for controlling a motor vehicle, comprising:
    controlling a longitudinal speed of the motor vehicle to a predetermined value;
    scanning an upcoming driving route with a sensor on board the motor vehicle;
    determining one end of a section of the driving route which is visible with the sensor;
    determining, via the sensor, a shadowed section of the driving route;
    determining a distance up to the shadowed section;
    determining whether the distance is smaller than a predetermined threshold value, wherein the threshold value is a function of a speed of the vehicle;
    presuming a presence of an obstacle on the driving route beyond a visible section if the distance is not smaller than the threshold value, wherein the presence of the obstacle is presumed even though it cannot be viewed;
    determining another distance up to the obstacle;
    determining, based on the another distance, a deceleration value for maintaining a predetermined minimum distance between the motor vehicle and the obstacle;
    checking whether the deceleration value exceeds a predetermined maximum deceleration; and
    outputting a signal to a driver of the motor vehicle to inform the driver to take longitudinal control of the motor vehicle.

2. The method as recited in claim 1, wherein the obstacle is presumed to be a preceding vehicle on the driving route having a predetermined speed.

3. The method as recited in claim 1, wherein it is presumed that the obstacle is stationary on the driving route.

4. The method as recited in claim 1, wherein it is determined that an object is situated in a scanning range of the sensor which shadows a section of the driving route in the scanning range, and wherein an end of the visible section corresponds to a beginning of the shadowed section.

5. The method as recited in claim 4, wherein the driving route includes a curve and the object is situated on an inner side of the curve next to the driving route.

6. The method as recited in claim 1, wherein the control of the longitudinal speed is ended if a distance from the obstacle falls below a predetermined distance.

7. The method as recited in claim 1, wherein the signal is output before an actual obstacle is detected on the driving route.

8. The method as recited in claim 1, wherein the control of the longitudinal speed is suspended as long as the deceleration required for maintaining a minimum distance from the obstacle beyond the visible section exceeds the predetermined threshold value.

9. The method as recited in claim 1, wherein the longitudinal speed of the motor vehicle is reduced until the deceleration required for maintaining a predetermined minimum distance from the obstacle maintains the predetermined threshold value.

10. The method as recited in claim 1, wherein multiple alternative upcoming driving routes are determined and the determination of the signal is carried out for all driving routes.

11. A computer program product having a program code that one of runs on a processing device and is stored in a computer-readable data carrier, for carrying out a method, comprising:
    controlling a longitudinal speed of the motor vehicle to a predetermined value;
    scanning an upcoming driving route with a sensor on board the motor vehicle;
    determining one end of a section of the driving route which is visible with the sensor;
    determining, via the sensor, a shadowed section of the driving route;
    determining a distance up to the shadowed section;
    determining whether the distance is smaller than a predetermined threshold value, wherein the threshold value is a function of a speed of the vehicle;
    presuming a presence of an obstacle on the driving route beyond a visible section if the distance is not smaller than the threshold value, wherein the presence of the obstacle is presumed even though it cannot be viewed;
    determining another distance up to the obstacle;
    determining, based on the another distance, a deceleration value for maintaining a predetermined minimum distance between the motor vehicle and the obstacle;
    checking whether the deceleration value exceeds a predetermined maximum deceleration; and
    outputting a signal to a driver of the motor vehicle to inform the driver to take longitudinal control of the motor vehicle.

12. A device for controlling a motor vehicle, comprising:
a speed controller for controlling a longitudinal speed of the motor vehicle to a predetermined value;
a sensor on board the motor vehicle for scanning an upcoming driving route, and
a signaling device for outputting a signal to a driver,
a determining arrangement for performing the following:
  determining one end of a section of the driving route which is visible with the sensor;
  determining, via the sensor, a shadowed section of the driving route;
  determining a distance up to the shadowed section;
  determining whether the distance is smaller than a predetermined threshold value, wherein the threshold value is a function of a speed of the vehicle;
  presuming a presence of an obstacle on the driving route beyond a visible section if the distance is not smaller than the threshold value, wherein the presence of the obstacle is presumed even though it cannot be viewed;
  determining another distance up to the obstacle;
  determining, based on the another distance, a deceleration value for maintaining a predetermined minimum distance between the motor vehicle and the obstacle;
  checking whether the deceleration value exceeds a predetermined maximum deceleration; and
an output arrangement to output a signal to the driver of the motor vehicle with the signaling device to inform the driver to take longitudinal control of the motor vehicle.

* * * * *